(12) United States Patent
Bonn et al.

(10) Patent No.: US 8,412,229 B1
(45) Date of Patent: Apr. 2, 2013

(54) POSITION DETERMINING ENTITY REQUEST FILTER

(75) Inventors: Mark J. Bonn, Granite Bay, CA (US); Victor M. Gress, Leavenworth, KS (US); Raghava V. Nidraghatta Karanam, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 337 days.

(21) Appl. No.: 12/908,544

(22) Filed: Oct. 20, 2010

(51) Int. Cl.
*H04W 24/00* (2009.01)

(52) U.S. Cl. ..................... 455/456.1; 370/310

(58) Field of Classification Search .................. 370/310, 370/328–330, 341, 468; 455/404.2, 414.2, 455/440, 456.2, 456.5, 456.6
See application file for complete search history.

(56) References Cited

U.S. PATENT DOCUMENTS

| | | | |
|---|---|---|---|
| 6,757,545 B2 | 6/2004 | Nowak et al. | |
| 6,885,336 B2 | 4/2005 | Forrester | |
| 7,130,641 B1 | 10/2006 | Al-Khashti et al. | |
| 7,302,225 B2 | 11/2007 | Younis | |
| 7,398,094 B2 | 7/2008 | Forrester | |
| 7,574,218 B2 | 8/2009 | Forrester et al. | |
| 2003/0195008 A1 | 10/2003 | Mohi et al. | |
| 2005/0066044 A1 | 3/2005 | Chaskar et al. | |
| 2006/0083192 A1 | 4/2006 | Dinescu et al. | |
| 2007/0153696 A1 | 7/2007 | Choyi et al. | |
| 2007/0206553 A1 | 9/2007 | Khushu et al. | |
| 2008/0070589 A1 | 3/2008 | Hansen et al. | |
| 2009/0233626 A1 | 9/2009 | Despot, Jr. | |

*Primary Examiner* — Kerri Rose (57) ABSTRACT

A method of operating a position determining entity filter comprises receiving a request for location assistance data transmitted from a wireless communication device, wherein the request is associated with a source packet address and includes a user identifier, and processing the request to determine if the user identifier is associated with the source packet address. The method further comprises, if the user identifier is not associated with the source packet address, initiating a count to track a number of requests for the location assistance data transmitted from the wireless communication device, and removing data previously associated with the user identifier and the source packet address. The method further comprises, if the user identifier is associated with the source packet address, incrementing the count and determining if a flag is assigned to the user identifier, inhibiting future requests if the flag is assigned to the user identifier, and if the flag is not assigned to the user identifier, determining if the count exceeds a threshold, and if the count exceeds the threshold, assigning the flag to the user identifier.

20 Claims, 6 Drawing Sheets

POSITION DETERMINING ENTITY REQUEST FILTER

TECHNICAL BACKGROUND

Wireless communications have become increasingly prominent for sending and receiving information. For example, individuals may utilize a wireless communication device for voice communications, research, entertainment, or for conducting critical business transactions. Some of these services require the location of the wireless communication device in order to operate, which is often obtained via the Global Positioning System (GPS). In order for a wireless device to determine its geographic location using GPS, it typically must search for and acquire signals from GPS elements, such as satellites. This process can be time consuming.

To reduce the amount of time required for the wireless communication device to acquire its location, many modern wireless communication networks typically provide a network-assisted GPS capability. Assisted GPS (A-GPS) allows the network to aid the wireless device in determining the device's geographic location. By utilizing a position determining entity (PDE), A-GPS provides orbital data or ephemeris for the GPS satellites to the GPS receiver in the wireless device, enabling the GPS receiver to lock on to the satellites more rapidly in some cases. Thus, A-GPS obviates the need for the wireless communication device to search for the GPS elements itself.

Typically, a wireless communication provider must purchase PDE session licenses to ensure PDE requests from a wireless communication device are processed by the PDE. If all PDE session licenses are consumed, new requests to the PDE are queued and potentially expire if no session licenses become available in a specified period of time. Unfortunately, if a pending PDE request is rejected due to a lack of PDE session licenses, the service that required the PDE request could fail to execute, thereby impacting the user of the wireless communication device.

OVERVIEW

A method of operating a position determining entity filter comprises receiving a request for location assistance data transmitted from a wireless communication device, wherein the request is associated with a source packet address and includes a user identifier for a user of the wireless communication device, and processing the request to determine if the user identifier is associated with the source packet address. The method further comprises, if the user identifier is not associated with the source packet address, initiating a count to track a number of requests for the location assistance data transmitted from the wireless communication device, and removing data previously associated with the user identifier and the source packet address. The method further comprises, if the user identifier is associated with the source packet address, incrementing the count and determining if a flag is assigned to the user identifier. The method further comprises inhibiting future requests if the flag is assigned to the user identifier, and if the flag is not assigned to the user identifier, determining if the count exceeds a threshold, and if the count exceeds the threshold, assigning the flag to the user identifier.

A position determining entity filter comprises a communication transceiver and a processing system. The communication transceiver is configured to receive a request for location assistance data transmitted from a wireless communication device, wherein the request is associated with a source packet address and includes a user identifier for a user of the wireless communication device. The processing system is configured to process the request to determine if the user identifier is associated with the source packet address, and if the user identifier is not associated with the source packet address, initiate a count to track a number of requests for the location assistance data transmitted from the wireless communication device and remove data previously associated with the user identifier and the source packet address, and if the user identifier is associated with the source packet address, increment the count and determine if a flag is assigned to the user identifier. The processing system is configured to, if the flag is assigned to the user identifier, inhibit future requests, and if the flag is not assigned to the user identifier, determine if the count exceeds a threshold, and if the count exceeds the threshold, assign the flag to the user identifier.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
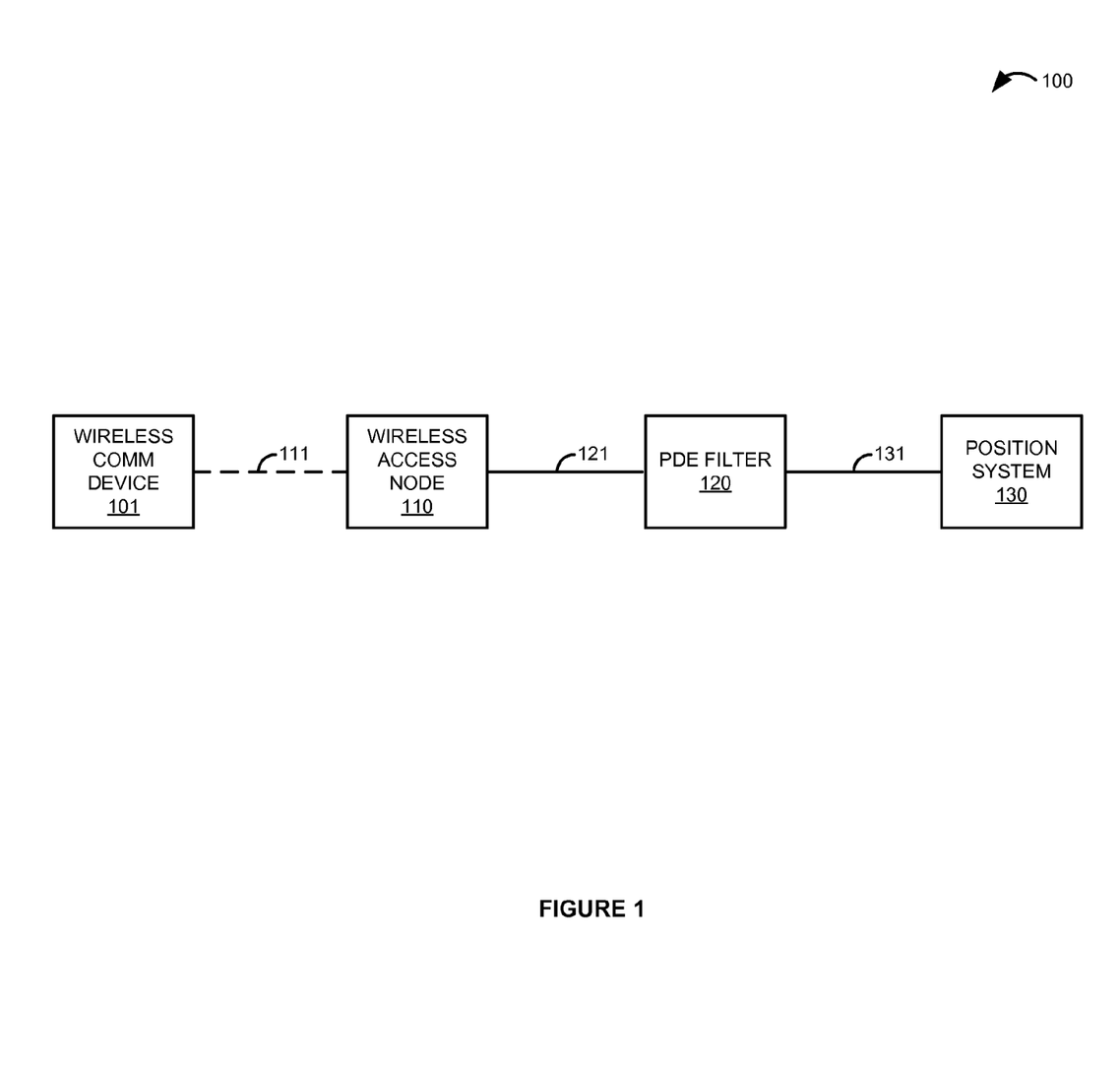
FIG. 1 is a block diagram that illustrates a communication system.

FIG. 1 is a block diagram that illustrates communication system 100. Communication system 100 includes wireless communication device 101, wireless access node 110, position determining entity (PDE) filter 120, and position system 130. Wireless communication device 101 and wireless access node 110 are in communication over wireless communication link 111. Wireless access node 110 and PDE filter 120 communicate over communication link 121. PDE filter 120 and position system 130 are in communication over communication link 131.

Figure 2:
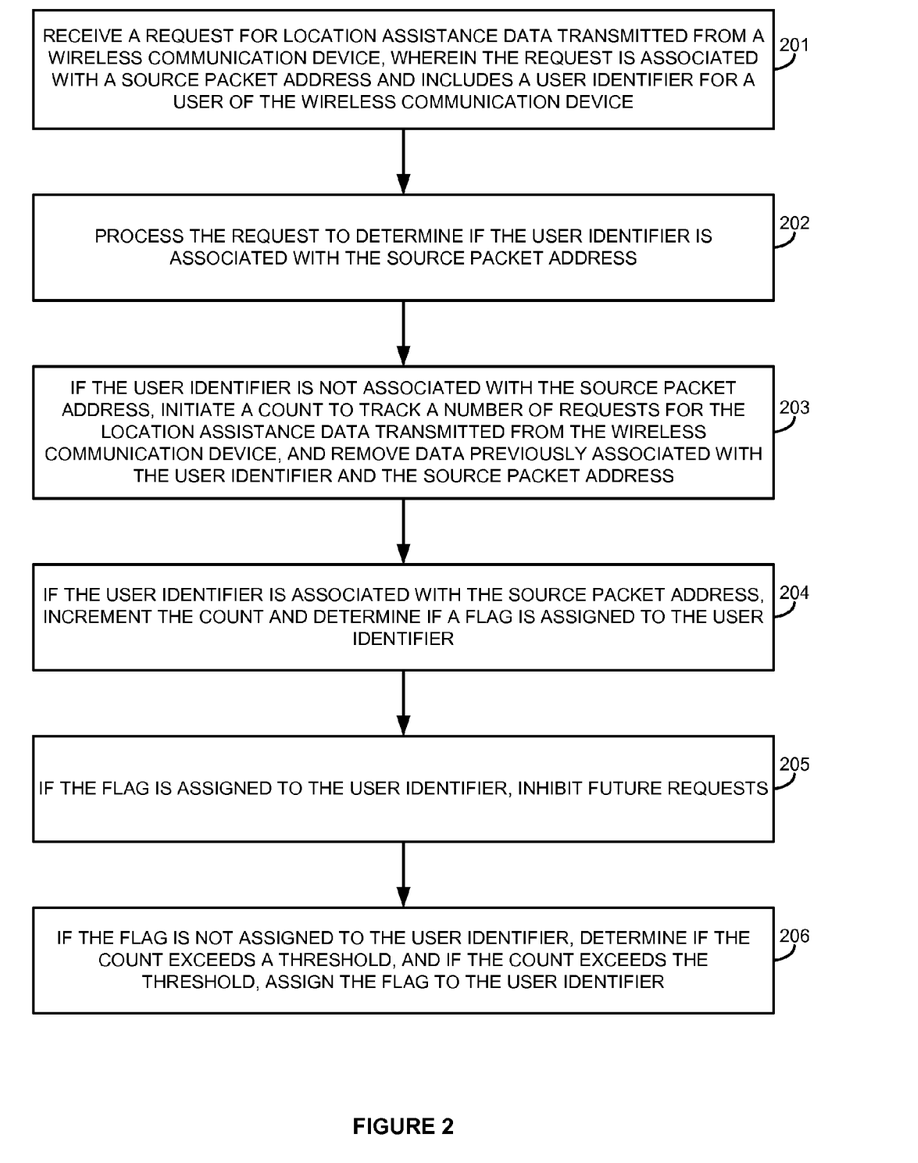
FIG. 2 is a flow diagram that illustrates an operation of the communication system.

FIG. 2 is a flow diagram that illustrates an operation of communication system 100. The steps of the operation are indicated below parenthetically.

In FIG. 2, PDE filter 120 receives a request for location assistance data transmitted from wireless communication device 101 (201). The request for location assistance data could comprise any request for information associated with determining a location of wireless communication device 101. For example, the location assistance data could comprise any data that wireless communication device 101 could utilize for an A-GPS fix, an advanced forward link trilateration (AFLT) fix, a cell sector center fix, a hybrid fix, or any other location determination technique—including combinations thereof. In some examples, the request for the location assistance data could comprise a request for global positioning system (GPS) satellite locations, positions, and orbital data. For example, the location assistance data could comprise satellite ephemeris data in some examples.

The request for the location assistance data is associated with a source packet address and includes a user identifier for a user of wireless communication device 101 (201). For example, PDE filter 120 typically receives the request from a source packet address associated with wireless communication device 101. However, one of skill in the art will understand that the functions described herein for PDE filter 120 could be distributed in either wireless access node 110 and/or position system 130. In some examples, the user identifier could comprise a Mobile Station Identifier (MSID), International Mobile Subscriber Identity (IMSI), Mobile Identification Number (MIN), User Identifier (UID), or some other identifier that identifies a user of wireless communication device 101.

After receiving the request for the location assistance data, PDE filter 120 processes the request to determine if the user identifier is associated with the source packet address (202). For example, PDE filter 120 could maintain a list or table of user identifiers and corresponding source packet addresses from which requests for location assistance data are received, and then compare the source packet address associated with the user identifier in the list to the source packet address associated with the request for location assistance data transmitted from wireless communication device 101. In some examples, PDE filter 120 could access a network database to query the table of user identifiers and corresponding source packet addresses to determine if the user identifier is associated with the source packet address.

If the user identifier is not associated with the source packet address, PDE filter 120 initiates a count to track a number of requests for the location assistance data transmitted from wireless communication device 101, and removes data previously associated with the user identifier and the source packet address (203). Typically, PDE filter 120 initiates the count by setting the count equal to a value of zero or one, but in some examples, any initial value for the count could be used. In addition to initiating the count if the user identifier is not associated with the source packet address, PDE filter 120 also removes data previously associated with the user identifier and the source packet address. For example, PDE filter 120 may unassign a different user identifier from the source packet address that was previously assigned to the source packet address, may clear flags assigned to the user identifier and/or the source packet address, or remove any other data previously associated with the user identifier and the source packet address. In some examples, removing data previously associated with the user identifier and the source packet address could comprise resetting the count associated with the user identifier and the source packet address pair, if a count had previously been established to track a number of requests for the location assistance data transmitted from wireless communication device 101.

However, if the user identifier is associated with the source packet address, PDE filter 120 increments the count and determines if a flag is assigned to the user identifier (204). Typically, PDE filter 120 increments the count by a value of one, although in some examples, the count could be incremented by any value. In addition to incrementing the count if the user identifier is associated with the source packet address, PDE filter 120 also determines if a flag is assigned to the user identifier. For example, PDE filter 120 or some other communication system may have previously assigned a flag to the user identifier in a table of a database or some other data structure, and PDE filter 120 could query the database to determine if the flag is assigned to the user identifier.

If the flag is assigned to the user identifier, PDE filter 120 inhibits future requests (205). To inhibit the future requests, PDE filter 120 typically blocks or restricts the future requests for the location assistance data transmitted from wireless communication device 101. For example, PDE filter 120 could identify requests from wireless communication device 101 based on the user identifier and the source packet address, and prevent those requests from being transferred to position system 130. In some examples, PDE filter 120 could block the future requests for the location assistance data transmitted from wireless communication device 101 for a time period. For example, the flag assigned to the user identifier could comprise a timestamp to indicate when the flag was assigned so that PDE filter 120 may inhibit future requests from wireless communication device 101 for some period of time after the timestamp. The time period during which PDE filter 120 inhibits future requests from the flagged user identifier is typically predetermined, but could be a dynamic or variable time period. Upon expiration of the time period, PDE filter 120 may remove the flag from the user identifier and reset the count in some examples.

However, if the flag is not assigned to the user identifier, PDE filter 120 determines if the count exceeds a threshold, and if the count exceeds the threshold, PDE filter 120 assigns the flag to the user identifier (206). To determine if the count exceeds the threshold, PDE filter 120 could compare the value of the count to a threshold value, which could be predetermined or determined dynamically. In some examples, PDE filter 120 may determine if the count exceeds the threshold during a second time period, and assigns the flag to the user identifier if the count exceeds the threshold during the second time period. For example, if requests for the location assistance data transmitted from wireless communication device 101 are received "N" number of times during a time period of "X", PDE filter 120 assigns the flag to the user identifier to inhibit future requests for the location assistance data transmitted from wireless communication device 101, and could continue to inhibit future requests for a time period "T" in some examples.

Advantageously, the operation of communication system 100 shown in FIG. 2 enables a communication service provider to limit the number of requests for location assistance data transmitted from wireless communication device 101. For example, if wireless communication device 101 is transmitting an excessive number of requests for location assistance data, a communication service provider can utilize PDE filter 120 to effectively throttle a number of those requests that are actually delivered to position system 130. In this manner, a communication service provider can preserve network resources and licenses that may be required to process requests for location assistance data using position system 130.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNode B), and others. Wireless network protocols that may be utilized by wireless access node 110 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Position determining entity (PDE) filter 120 comprises a processing system and communication transceiver. PDE filter 120 may also include other components such as a router, server, data storage system, and power supply. PDE filter 120 may reside in a single device or may be distributed across multiple devices. PDE filter 120 may be a discrete system or may be integrated within other systems—including other systems within communication system 100. For example, the functions described herein for PDE filter 120 could be distributed in either wireless access node 110 and/or position system 130, in addition or alternatively to PDE filter 120. In some examples, PDE filter 120 could comprise a mobile switching center, router, switching system, packet gateway, network gateway system, Internet access node, application server, service node, firewall, or some other communication system—including combinations thereof.

Position system 130 comprises a processing system and communication transceiver. Position system 130 may also include other components such as a router, server, data storage system, and power supply. Position system 130 may reside in a single device or may be distributed across multiple devices. Position system 130 may be a discrete system or may be integrated within other systems—including other systems within communication system 100. In some examples, position system 130 could comprise a position determining entity (PDE), location determination system, virtual positioning center, mobile switching center, router, switching system, packet gateway, network gateway system, Internet access node, application server, service node, firewall, or some other communication system—including combinations thereof.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121 and 131 use metal, air, space, optical fiber such as glass or plastic, or some other material as the transport media—including combinations thereof. Communication links 121 and 131 could use various communication protocols, such as TDM, IP, Ethernet, telephony, optical networking, hybrid fiber coax (HFC), communication signaling, wireless protocols, or some other communication format—including combinations thereof. Communication links 121 and 131 may be direct links or could include intermediate networks, systems, or devices.

Figure 3:
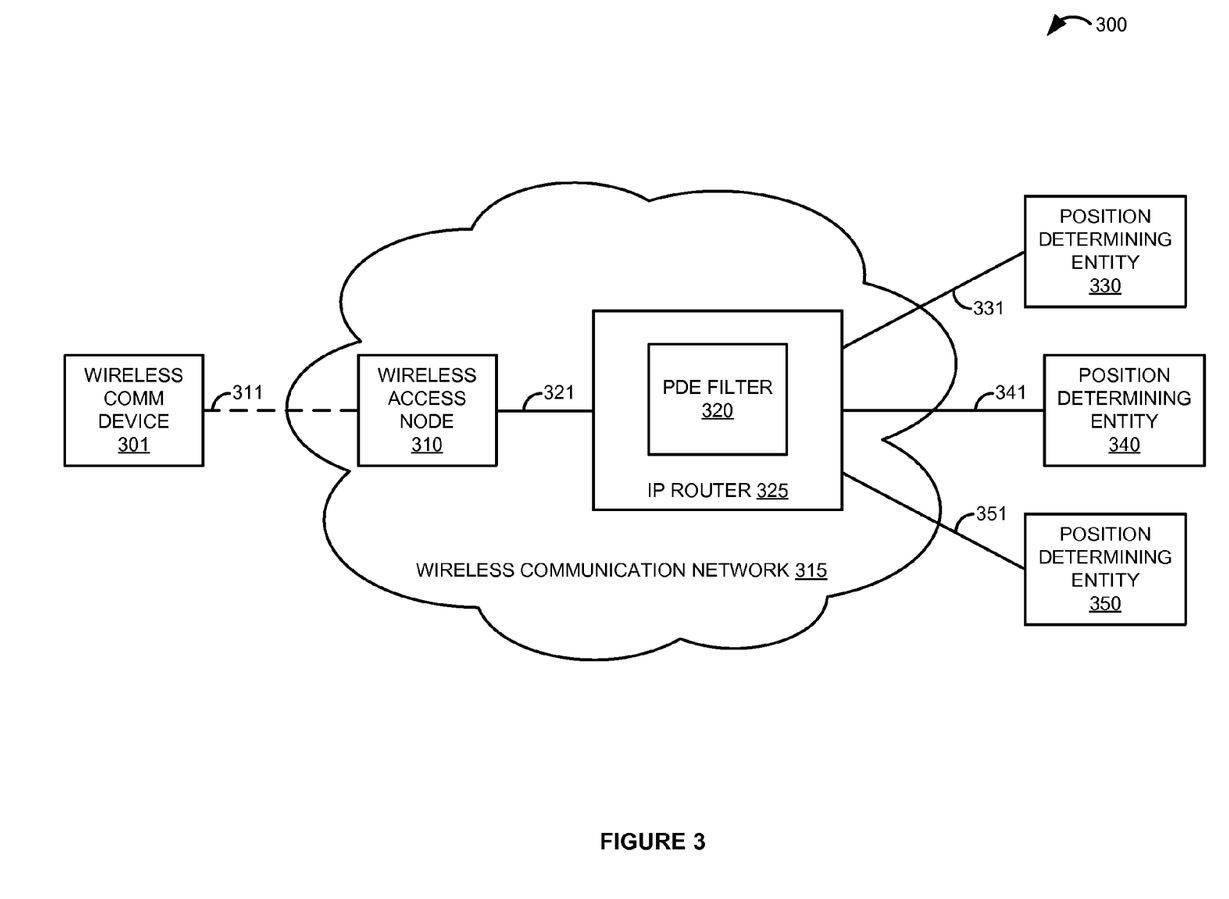
FIG. 3 is a block diagram that illustrates a communication system in an exemplary embodiment.

FIG. 3 is a block diagram that illustrates communication system 300. Communication system 300 includes wireless communication device 301, wireless communication network 315, and position determining entities (PDEs) 330, 340, and 350. Wireless communication network 315 includes wireless access node 310 and Internet Protocol (IP) router 325. IP router 325 includes PDE filter 320, which could comprise a software module configured to execute on IP router 325 in some examples. Wireless communication device 301 and wireless access node 310 communicate over wireless communication link 311. Wireless access node 310 and IP router 325 are in communication over communication link 321. IP router 325 and PDE 330 communicate over communication link 331. Likewise, IP router 325 and PDE 340 communicate over communication link 341, while IP router 325 and PDE 350 are in communication over communication link 351.

Figure 4:
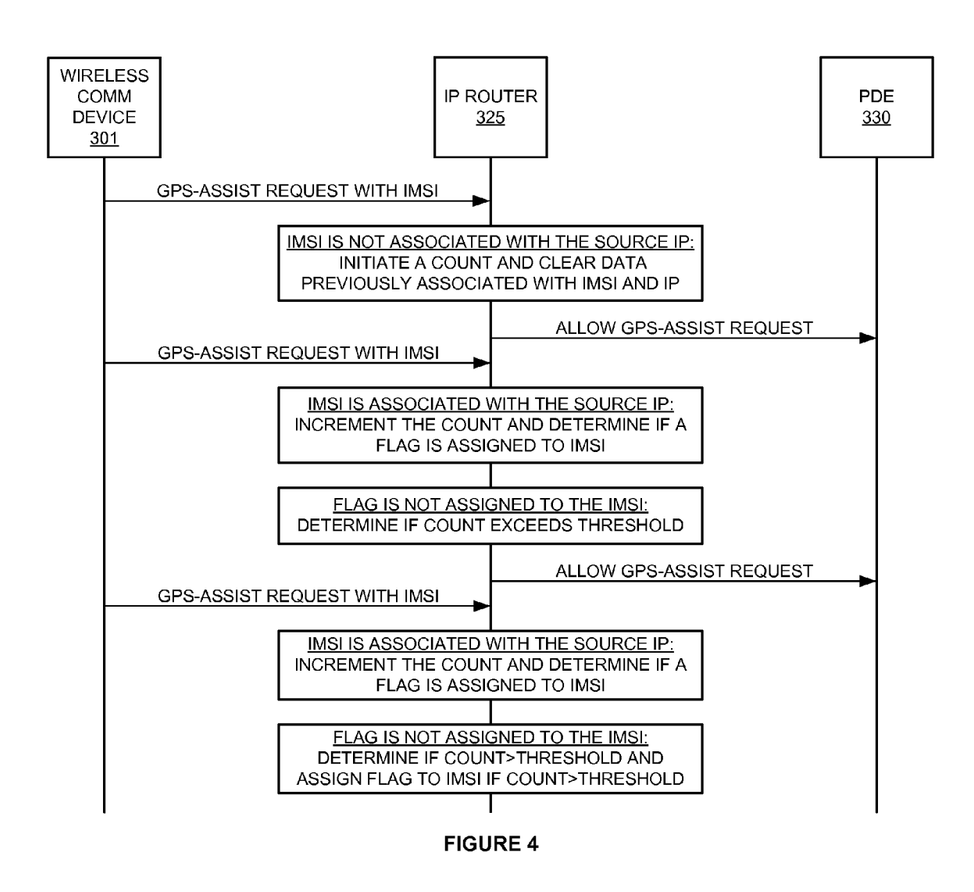
FIG. 4 is a sequence diagram that illustrates an operation of the communication system in an exemplary embodiment.

FIG. 4 is a sequence diagram that illustrates an operation of communication system 300 in an exemplary embodiment. In this example, wireless communication device 301 has a firmware bug in the gpsOne location layer, causing device 301 to request an excessive amount of GPS ephemeris data from the PDE 330. For example, due to the firmware bug, wireless communication device 301 may continue to request satellite ephemeris data from PDE 330 until it receives a good package of eight or more healthy satellites, which may never occur. These excessive GPS ephemeris requests are of great concern to a communication service provider of wireless communication network 315, since the provider must pay a licensing fee for each PDE session license consumed by a PDE request. Unfortunately, the malfunctioning wireless communication device 301 could potentially consume hundreds or thousands of PDE session licenses per day, as opposed to a properly operating wireless communication device, which typically requests ephemeris data from PDE 330 only five to ten times per day.

To curb the PDE session request abuse perpetrated by wireless communication device 301, PDE filter 320 logic has been added to IP router 325 in this example. IP router 325 is therefore configured to filter PDE requests from wireless communication device 301 if the number of requests received during a time period exceed a threshold. In this example, the threshold is set to a value of two for purposes of simplicity and clarity, but greater thresholds would typically be used.

The operation shown on FIG. 4 begins when wireless communication device 301 transfers a GPS-assist request to wireless communication network 315. The GPS-assist request comprises a PDE request for satellite ephemeris data and includes the IMSI and/or MSID associated with wireless communication device 301. IP router 325 receives the GPS-assist request transmitted from wireless communication device 301 and processes the request to determine if the IMSI included in the request is associated with the source IP address from which the request was received. For example, IP router could maintain a table of IMSIs that have sent GPS-assist requests and their associated source IP addresses, and queries this table to determine if the IMSI is associated with the source IP address that transferred the request.

In this example, the table of IMSIs and source IP address pairs does not relate the IMSI of wireless communication device 301 with the source IP address over which device 301 transferred the GPS-assist request. This is due to wireless communication device 301 being recently assigned a new dynamic IP address from the home agent IP pool, so IP router 325 has not previously received a GPS-assist request from this IMSI and source IP address pair. Since the IMSI in the request is not associated with the source IP address that transferred the request, IP router 325 initiates a count to track a number of requests for the satellite ephemeris data transmitted from wireless communication device 301, and clears data that was previously associated with the IMSI and/or the source IP address in the table. IP router 325 then relates the IMSI and source IP address of wireless communication device 301 by entering the matching pair into the table. To initiate the count, IP router 325 creates a counter variable and sets the value equal to one, although any other initial value could be used. In some examples, the count could be stored in the table along with the IMSI and source IP address pair. IP router 325 then allows the GPS-assist request by transferring the request to PDE 330, which processes the request for GPS ephemeris data in the typical manner.

Subsequently, wireless communication device 301 transfers another GPS-assist request to wireless communication network 315. IP router 325 receives the GPS-assist request transmitted from wireless communication device 301 and again determines if the IMSI included in the request is associated with the source IP address of the request. This time, the IMSI of device 301 is associated with the source IP of the request, since IP router 325 entered this IMSI/source IP pairing into the table after receiving the previous GPS-assist request from wireless communication device 301, and device 301 has not acquired a new IP address in the interim. Therefore, IP router 325 increments the count and determines if a flag is assigned to the IMSI. In this example, the count is incremented to two, since the count was previously initialized and set to one when IP router 325 received the first PDE request from device 301. IP router 325 determines if the flag is assigned to the IMSI by checking if a request abuse flag has been assigned to the IMSI in the table. In this case, the IMSI has not been flagged, so IP router 325 determines if the count exceeds the threshold. As mentioned above, the threshold in this example is set to two. However, since the count is currently also two, the count does not exceed the threshold, so IP router 325 takes no further action except to allow the GPS-assist request and thus transfers the request to PDE 330 for processing.

Wireless communication device 301 then transfers a third GPS-assist request, which is received by IP router 325. As before, IP router 325 first determines if the IMSI included in the request is associated with the source IP of the request. Since the IMSI is paired with the source IP address in the table, IP router 325 increments the count to three and determines if a flag is assigned to the IMSI. Since no flag has yet been assigned to the IMSI in the table, IP router 325 determines if the count is greater than the threshold. Of course, one skilled in the art will realize that other comparisons between the count and the threshold are possible, such as equal to, greater than or equal to, and others. In this example, the threshold is two and the count is now three, so the count does exceed the threshold. Therefore, IP router 325 assigns a flag to the IMSI in the table since the count is greater than the threshold. The flag assigned to the IMSI signifies to IP router 325 that the IMSI is associated with a wireless communication device 301 that has exhibited PDE request abuse. Once the IMSI is flagged, future PDE requests for satellite ephemeris data transmitted from wireless communication device 301 having the flagged IMSI will be inhibited for a time period. In this example, the third GPS-assist request that prompted IP router 325 to flag the IMSI of device 301 is also blocked, but IP router 325 could allow this flag-triggering request in some examples. The operation of FIG. 4 continues in the sequence diagram of FIG. 5.

Figure 5:
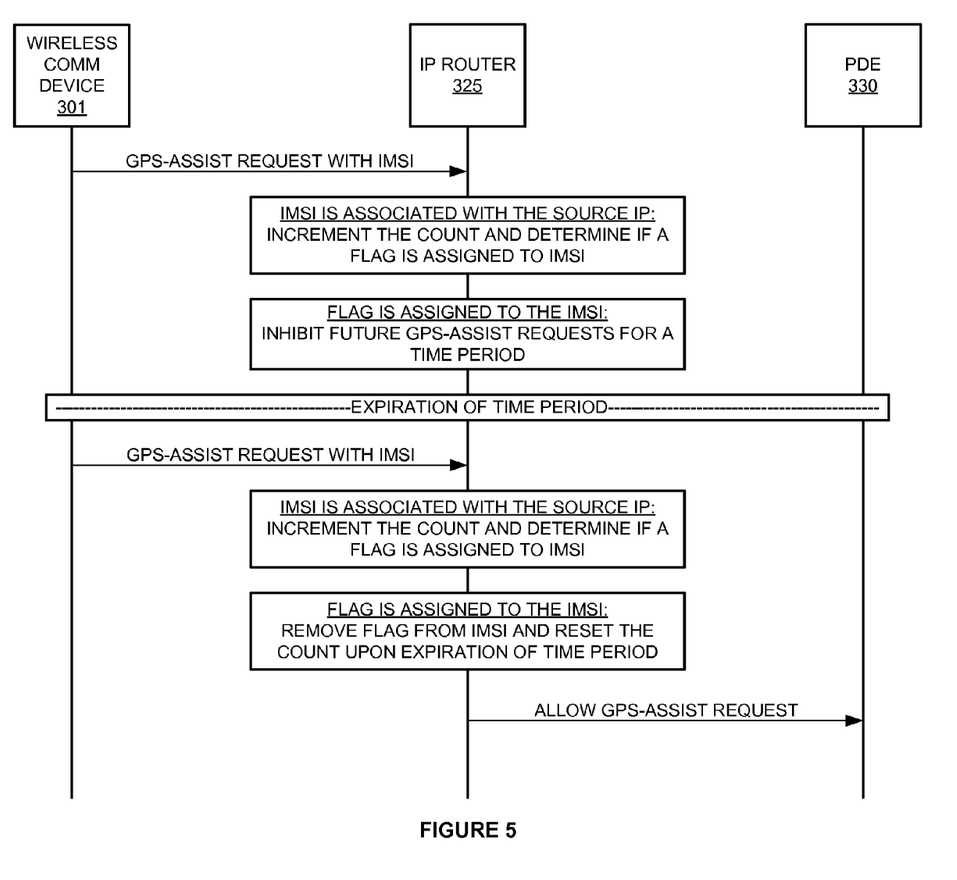
FIG. 5 is a sequence diagram that illustrates an operation of the communication system in an exemplary embodiment.

FIG. 5 is a sequence diagram that illustrates an operation of communication system 300 in an exemplary embodiment. FIG. 5 is a continuation of the sequence diagram illustrating the operation of communication system 300 beginning on FIG. 4. To summarize the current status, IP router 325 has initiated a count to track a number of requests for GPS ephemeris data transmitted from wireless communication device 301, and the count is now set to three since IP router 325 has previously received three GPS-assist requests from device 301 as shown in FIG. 4. Since the threshold for PDE requests is set to two, as discussed above with respect to FIG. 4, IP router 325 has flagged the IMSI of device 301 to indicate that the number of PDE requests received from wireless communication device 301 has exceeded the request abuse threshold of two.

Referring now to FIG. 5, wireless communication device 301 transmits a fourth GPS-assist request to wireless network 315, which is received by IP router 325. Whenever IP router 325 receives a PDE request, IP router 325 first determines if the IMSI included in the request is associated with the source IP of the request. As discussed above, IP router 325 previously associated the IMSI of device 301 with the source IP address in the table of IMSIs and source IP pairings during the operation shown in FIG. 4. Thus, IP router 325 determines that the IMSI is associated with the source IP of the request, and increments the count from three to four. IP router 325 then also determines if a flag is assigned to the IMSI.

Since IP router 325 previously flagged the IMSI during the operation shown in FIG. 4, IP router 325 queries the table and determines that the flag is assigned to the IMSI. Since the IMSI of device 301 has been flagged, IP router 325 inhibits future GPS-assist requests for a time period. For example, IP router 325 may log a timestamp when the last GPS-assist request is received from device 301 having a flagged IMSI, and will block future requests having that IMSI/source IP address pairing for the duration of the time period. The time period could be any predetermined or dynamic period, but some examples include one hour, ten hours, or one day. Any PDE requests received from the source IP address by IP router 325 during the time period having the flagged IMSI will be discarded and ignored, thereby preserving PDE resources and session licenses. However, in some examples, IP router 325 could allow a limited number of PDE requests to reach PDE 330, even when the IMSI of the requesting device 301 is flagged.

After expiration of the time period, as shown in FIG. 5 by the dashed line, wireless communication device 301 transfers a fifth GPS-assist request to wireless communication network 315, which is again received by IP router 325. As before, IP router 325 first determines if the IMSI included in the request is associated with the source IP address of the request. In this example, the IMSI of wireless communication device 301 is already associated with the source IP address that device 301 is utilizing to transfer the GPS-assist requests, so IP router 325 increments the count from four to five and determines if the flag is assigned to the IMSI.

At this stage, the flag has been assigned to the IMSI, so IP router 325 is configured to inhibit future requests for GPS ephemeris data transmitted from wireless communication device 301 on the source IP address for the duration of the time period. However, since the time period has expired, IP router 325 removes the flag from the IMSI in the table and resets the count to a value of one. IP router 325 then allows this latest GPS-assist request by transferring the request to PDE 330 for typical processing. In this manner, PDE requests transmitted by wireless communication device 301 are allowed to reach the PDE 330 as before, subject to the request abuse threshold that limits the number of times device 301 can request GPS ephemeris data from PDE 330 before having its IMSI flagged again. Note that if wireless communication device 301 ever receives a different IP address from the IP pool, which results in the IMSI and the source IP address not being associated in the table, IP router 325 will re-initiate the count back to one and clear any data that was previously associated with the IMSI and the new source IP address (which may have been previously associated with a different IMSI).

In some examples, when the threshold is compared to the count to determine if the IMSI should be flagged (discussed above with respect to FIG. 4), IP router 325 could also determine whether the count exceeds the threshold during a second time period, which is typically a different time period than the one in effect when the IMSI is flagged and IP router 325 is inhibiting PDE requests from that IMSI/source IP address pair. For example, when the count is first initialized, IP router 325 could start a timer for the count/threshold comparison, such as one hour, so that if the count exceeds the threshold during that time period of one hour, IP router 325 would flag the IMSI. However, if the count does not exceed the threshold during this one-hour time period, IP router could re-initialize the count, reset the timer, and repeat the process. In this manner, a wireless communication device which is functioning properly and requesting a typical number of satellite ephemeris data updates will not eventually get flagged for exceeding the threshold, provided the threshold comparison time period is set to a short enough duration to allow the counter to be reset before the count would otherwise exceed the threshold.

The count threshold for flagging the IMSI could also be user-specific, device-specific, or application-specific in some examples. For example, a user-specific threshold could apply to all wireless communication devices and applications executing on those devices that are associated with a user. A device-specific threshold could apply to a single wireless communication device associated with a user, but would not apply to additional devices associated with the user. For example, a user may have multiple wireless communication devices, but only one of the devices is malfunctioning and requesting excessive GPS ephemeris data from the PDE 330, so a device-specific threshold (and the corresponding count) would only apply to the one malfunctioning device. IP router 325 could track device-specific thresholds based on unique device identifiers included in the requests. In other examples, an application-specific threshold could apply to only a particular application executing on wireless communication device 301. For example, a software bug could exist only in one application executing on wireless communication device 301, and IP router 325 could determine that the PDE requests are all associated with the application based on a source and/or destination port of wireless communication device 301 that is associated with the application. Various combinations of the above thresholds are also contemplated herein, including multiple user thresholds, multiple device thresholds per user, and multiple application thresholds per device.

Figure 6:
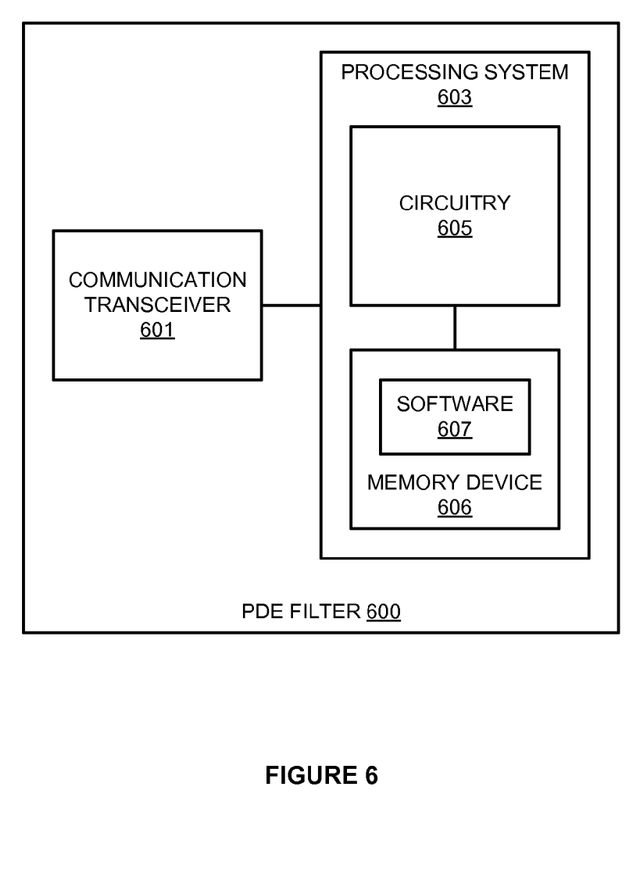
FIG. 6 is a block diagram that illustrates a position determining entity filter.

FIG. 6 is a block diagram that illustrates position determining entity (PDE) filter 600. PDE filter 600 provides an example of PDE filter 120, although filter 120 may use alternative configurations. PDE filter 600 comprises communication transceiver 601 and processing system 603. Processing system 603 is linked to communication transceiver 601. Processing system 603 includes processing circuitry 605 and memory device 606 that stores operating software 607.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof. In some examples, communication transceiver 601 could be configured to receive a request for location assistance data transmitted from a wireless communication device, wherein the request is associated with a source packet address and includes a user identifier for a user of the wireless communication device.

Processing circuitry 605 comprises microprocessor and other circuitry that retrieves and executes operating software 607 from memory device 606. Memory device 606 comprises a disk drive, flash drive, data storage circuitry, or some other memory apparatus. Operating software 607 comprises computer programs, firmware, or some other form of machine-readable processing instructions. Operating software 607 may include an operating system, utilities, drivers, network interfaces, applications, or some other type of software.

When executed by circuitry 605, operating software 607 directs processing system 603 to operate as described herein for PDE filter 120. In particular, operating software 607 may direct processing system 603 to direct communication transceiver 601 to receive a request for location assistance data transmitted from a wireless communication device, wherein the request is associated with a source packet address and includes a user identifier for a user of the wireless communication device. In addition, operating software 607 directs processing system 603 to process the request to determine if the user identifier is associated with the source packet address, and if the user identifier is not associated with the source packet address, initiate a count to track a number of requests for the location assistance data transmitted from the wireless communication device and remove data previously associated with the user identifier and the source packet address, and if the user identifier is associated with the source packet address, increment the count and determine if a flag is assigned to the user identifier. Further, operating software 607 directs processing system 603 to inhibit future requests if the flag is assigned to the user identifier, and if the flag is not assigned to the user identifier, determine if the count exceeds a threshold, and if the count exceeds the threshold, assign the flag to the user identifier.

In some examples, operating software 607 could comprise a request receiver software module that receives a request for location assistance data transmitted from a wireless communication device, wherein the request is associated with a source packet address and includes a user identifier for a user of the wireless communication device. Additionally, operating software 607 could comprise a request counting software module that processes the request to determine if the user identifier is associated with the source packet address, and if the user identifier is not associated with the source packet address, initiate a count to track a number of requests for the location assistance data transmitted from the wireless communication device and remove data previously associated with the user identifier and the source packet address, and if the user identifier is associated with the source packet address, increment the count and determine if a flag is assigned to the user identifier. Further, operating software 607 could comprise a flag threshold software module that inhibits future requests if the flag is assigned to the user identifier, and if the flag is not assigned to the user identifier, determines if the count exceeds a threshold, and if the count exceeds the threshold, assigns the flag to the user identifier.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a position determining entity filter, the method comprising:
   receiving a request for location assistance data transmitted from a wireless communication device, wherein the request is associated with a source packet address and includes a user identifier for a user of the wireless communication device;
   processing the request to determine if the user identifier is associated with the source packet address;
   if the user identifier is not associated with the source packet address, initiating a count to track a number of requests for the location assistance data transmitted from the wireless communication device, and removing data previously associated with the user identifier and the source packet address;
   if the user identifier is associated with the source packet address, incrementing the count and determining if a flag is assigned to the user identifier;
   if the flag is assigned to the user identifier, inhibiting future requests; and
   if the flag is not assigned to the user identifier, determining if the count exceeds a threshold, and if the count exceeds the threshold, assigning the flag to the user identifier.

2. The method of claim 1 wherein inhibiting the future requests comprises blocking the future requests for the location assistance data transmitted from the wireless communication device.

3. The method of claim 1 wherein inhibiting the future requests comprises inhibiting the future requests for the location assistance data transmitted from the wireless communication device for a time period.

4. The method of claim 1 wherein inhibiting the future requests comprises blocking the future requests for the location assistance data transmitted from the wireless communication device for a time period, removing the flag from the user identifier, and resetting the count upon expiration of the time period.

5. The method of claim 1 wherein inhibiting the future requests comprises restricting a number of the future requests for the location assistance data transmitted from the wireless communication device.

6. The method of claim 1 wherein determining if the count exceeds the threshold comprises determining if the count exceeds the threshold during a time period.

7. The method of claim 6 wherein assigning the flag to the user identifier if the count exceeds the threshold comprises assigning the flag to the user identifier if the count exceeds the threshold during the time period.

8. The method of claim 1 wherein removing the data previously associated with the user identifier and the source packet address comprises unassigning a different user identifier from the source packet address that was previously assigned to the source packet address.

9. The method of claim 1 wherein the request for the location assistance data transmitted from the wireless communication device comprises a position determining entity request.

10. The method of claim 1 wherein initiating the count to track the number of requests for the location assistance data transmitted from the wireless communication device comprises assigning a value of one to the count, and wherein incrementing the count comprises incrementing the count by one.

11. A position determining entity filter comprising:
    a communication transceiver configured to receive a request for location assistance data transmitted from a wireless communication device, wherein the request is associated with a source packet address and includes a user identifier for a user of the wireless communication device;
    a processing system configured to process the request to determine if the user identifier is associated with the source packet address, and if the user identifier is not associated with the source packet address, initiate a count to track a number of requests for the location assistance data transmitted from the wireless communication device and remove data previously associated with the user identifier and the source packet address, and if the user identifier is associated with the source packet address, increment the count and determine if a flag is assigned to the user identifier; and
    the processing system configured to, if the flag is assigned to the user identifier, inhibit future requests, and if the flag is not assigned to the user identifier, determine if the count exceeds a threshold, and if the count exceeds the threshold, assign the flag to the user identifier.

12. The filter of claim 11 wherein the processing system configured to inhibit the future requests comprises the processing system configured to block the future requests for the location assistance data transmitted from the wireless communication device.

13. The filter of claim 11 wherein the processing system configured to inhibit the future requests comprises the processing system configured to inhibit the future requests for the location assistance data transmitted from the wireless communication device for a time period.

14. The filter of claim 11 wherein the processing system configured to inhibit the future requests comprises the processing system configured to block the future requests for the location assistance data transmitted from the wireless communication device for a time period, remove the flag from the user identifier, and reset the count upon expiration of the time period.

15. The filter of claim 11 wherein the processing system configured to inhibit the future requests comprises the processing system configured to restrict a number of the future requests for the location assistance data transmitted from the wireless communication device.

16. The filter of claim 11 wherein the processing system configured to determine if the count exceeds the threshold comprises the processing system configured to determine if the count exceeds the threshold during a time period.

17. The filter of claim 16 wherein the processing system configured to assign the flag to the user identifier if the count exceeds the threshold comprises the processing system configured to assign the flag to the user identifier if the count exceeds the threshold during the time period.

18. The filter of claim 11 wherein the processing system configured to remove the data previously associated with the user identifier and the source packet address comprises the processing system configured to unassign a different user identifier from the source packet address that was previously assigned to the source packet address.

19. The filter of claim 11 wherein the request for the location assistance data transmitted from the wireless communication device comprises a position determining entity request.

20. A method of operating a position determining entity filter, the method comprising:
receiving a request for location assistance data transmitted from a wireless communication device, wherein the request is associated with a source packet address and includes a user identifier for a user of the wireless communication device;
processing the request to determine if the user identifier is associated with the source packet address;
if the user identifier is not associated with the source packet address, initiating a count to track a number of requests for the location assistance data transmitted from the wireless communication device, and removing data previously associated with the user identifier and the source packet address;
if the user identifier is associated with the source packet address, incrementing the count and determining if a flag is assigned to the user identifier;
if the flag is assigned to the user identifier, inhibiting future requests for the location assistance data transmitted from the wireless communication device for a first time period, removing the flag from the user identifier, and resetting the count upon expiration of the first time period; and
if the flag is not assigned to the user identifier, determining if the count exceeds a threshold during a second time period, and assigning the flag to the user identifier if the count exceeds the threshold during the second time period.

* * * * *